(12) United States Patent
Marchionni et al.

(10) Patent No.: US 7,214,833 B2
(45) Date of Patent: May 8, 2007

(54) PROCESS FOR PREPARING PERFLUOROPOLYETHERS

(75) Inventors: Giuseppe Marchionni, Milan (IT); Elvira Pagano, Milan (IT); Pier Antonio Guarda, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 173 days.

(21) Appl. No.: 10/953,764

(22) Filed: Sep. 30, 2004

(65) Prior Publication Data

US 2005/0075517 A1  Apr. 7, 2005

(30) Foreign Application Priority Data

Oct. 3, 2003 (IT) .................... MI2003A1915

(51) Int. Cl.
*C07C 41/05* (2006.01)
(52) U.S. Cl. ...................... 568/615; 568/621
(58) Field of Classification Search ................ 568/615, 568/621
See application file for complete search history.

(56) References Cited

U.S. PATENT DOCUMENTS

| | | | |
|---|---|---|---|
| 3,704,214 A | 11/1972 | Sianesi et al. ............. 204/158 |
| 3,715,378 A | 2/1973 | Sianesi et al. ............. 260/463 |
| 3,722,792 A | 3/1973 | Lawrence et al. ........... 234/38 |
| 4,451,646 A * | 5/1984 | Sianesi et al. ............. 528/401 |
| 4,664,766 A * | 5/1987 | Marchionni et al. ... 204/157.92 |
| 4,755,330 A * | 7/1988 | Viola et al. ................ 562/849 |
| 5,149,842 A | 9/1992 | Sianesi et al. ............. 549/550 |
| 5,258,110 A | 11/1993 | Sianesi et al. ......... 204/157.92 |
| 5,744,651 A * | 4/1998 | Marchionni et al. ........ 568/560 |
| 5,777,291 A * | 7/1998 | Marchionni et al. ..... 204/157.6 |
| 5,783,789 A * | 7/1998 | Guarda et al. .......... 204/157.6 |
| 5,872,157 A | 2/1999 | DeSimone et al. |
| 2002/0163629 A1 | 11/2002 | Switkes et al. ............... 355/53 |

FOREIGN PATENT DOCUMENTS

| | | | |
|---|---|---|---|
| EP | 0 393 700 A1 | 10/1990 |
| EP | 1 388 555 A2 | 2/2004 |
| EP | 1 454 938 A1 | 9/2004 |
| GB | 1 226 566 | * 3/1971 |
| WO | WO 97/35906 A1 | 10/1997 |
| WO | WO 02/06375 A2 | 1/2002 |
| WO | WO 02/12404 A2 | 2/2002 |
| WO | WO 02/38718 A2 | 5/2002 |

OTHER PUBLICATIONS

Sianesi, Dario, et al., "Perfluoropolyethers (PFPEs) from Perfluoroolefin Photooxidation", Organofluorine Chemistry: Principles and Commercial Applications, Plenum Press, New York, 1994, pp. 431-461.

Marchionni, Giuseppe, et al., "Perfluoropolyethers: Synthesis and Commercial Products", Fluoropolymers '92, Jan. 6-8, 1992 at UMIST Manchester, Paper 14, pp. 1-13.

* cited by examiner

*Primary Examiner*—Rosalynd Keys
(74) *Attorney, Agent, or Firm*—Arent Fox PLLC

(57) ABSTRACT

A process to obtain perfluoropolyethers comprising:
a) synthesis of peroxidic perfluoropolyethers by one of the following reactions:
a1) TFE photooxidation, in solvents selected between perfluorocarbons and (mono)hydrofluorocarbons, of general formula:

$$C_yF_{(2y+2-x)}H_x \quad \text{(II)}$$

wherein y is an integer from 2 to 4; x is an integer equal to 0 or 1; in the present of fluorine diluted with an inert gas; or
a2) TFE oxidation using as radical initiator fluorine or hypofluorites of formula $$R_fOF \quad \text{(III)}$$

($R_f$ perfluoroalkyl radical from 1 to 3 carbon atoms), operating from −40° C. to −100° C. at a pressure comprised between 0 and 12 bar;
b) thermal treatment of the product obtained in a) at a temperature from 1500° C. to 250° C.;
c) treatment with elemental fluorine of the polymer obtained in step b) at temperatures from 100° C. to 250° C., or by treatment with fluorine in the presence of UV radiations, operating at temperatures from −50° C. to 120° C.

16 Claims, No Drawings

PROCESS FOR PREPARING PERFLUOROPOLYETHERS

The present invention relates to perfluoropolyethers and to a process for preparing them, having an improved (reduced) absorbance at wave lengths lower than 250 nm, in particular usable as index matching medium in the immersion lithography wherein a wave length of 157 nm is used.

More specifically the present invention relates to a process for the preparation of perfluoropolyethers characterized by the following combination of properties:
the risk of accidental explosions, due to an uncontrolled P.O. increase higher than 4–5 (g of active oxygen/100 g of polymer), is greatly reduced;
improved selectivity of the chain transfer agent, of the order of 90%;
elimination of the activator use to reduce the reaction induction time.

Polymerization processes for the preparation of perfluoropolyethers in the presence of UV radiations or in the absence of said radiations with the use of polymerization initiators are well known. See for example U.S. Pat. No. 3,704,214, U.S. Pat. No. 3,715,378, U.S. Pat. No. 3,722,792, U.S. Pat. No. 5,258,110, U.S. Pat. No. 5,149,842.

It is well known that the peroxidic polymer formed in the first reaction step to obtain the perfluoropolyether polymers must be solubilized also at high molecular weights by the reaction solvents forming an homogeneous solution, avoiding the separation of the peroxidic polymer. This prevents cloggings of the industrial plant piping due to uncontrolled viscosity increases occur. Besides, if this is achieved, the thermal exchanges are extremely effective and the uncontrolled degradation of the peroxidic polymer is avoided.

In the synthesis of peroxidic perfluoropolyether it is required that the regulating agent of the molecular weight, when it is used, allows the control of the reaction mass viscosity to favour the thermal exchange, avoiding the polymer separation during the synthesis. Furthermore it would be desirable that the regulating agent of the molecular weight in the synthesis step of the peroxidic perfluoropolyether would give improved selectivities of the order of 90%, avoiding undesired secondary local reactions leading to process interruptions owing to the fouling of the reactor and of the optical system (UV lamp) in the case of polymerization in the presence of UV radiations. Furthermore in said cases there can be an uncontrolled P.O. increase, higher than 4–5 (g of active oxygen/100 g of polymer), leading to explosion risks in the system.

It was furthermore desirable that in the synthesis step of the peroxidic perfluoropolyether the reaction induction times were reduced or substantially removed, avoiding the use of activators.

In patent application USP 2002/0163629 it has been described the use of perfluoropolyethers (PFPE) as fluid in optical systems at wave lengths lower than 250 nm, in particular as index matching medium, for lithographic apparatus working at wave lengths lower than 220 nm and specifically at 157 nm. In this patent application absorbance data for the perfluoropolyether having a linear structure commercially known as Fomblin® Z, are reported. It is stated that the absorbance of this perfluoropolyether at the wave length of 157 nm is such that a fluid layer of 50 μm absorbs 10% of the incident light.

It is known that the commercial product Fomblin® Z is obtained by a synthesis process comprising the following steps:

1) tetrafluoroethylene photooxidation, in the presence of UV light, at temperatures between −40° C. and −100° C., in the presence of a reaction solvent, generally CFC 12 ($CF_2Cl_2$), optionally in the presence of CTFE (chlorotrifluoroethylene $CFCl=CF_2$) as chain transfer agent;
2) thermal treatment of the peroxidic perfluoropolyether obtained in the previous step at temperatures in the range 180° C.–250° C.;
3) neutralization of the acid end groups of the polymer obtained in step 2) by treatment with fluorine at temperatures from 100° C. to 250° C., or by treatment with fluorine in the presence of UV radiations, operating at temperatures in the range 50° C.–120° C.

See D. Sianesi et al. "Organic Fluorine Chemistry, Principles and Commercial Applications" Plenum Press 1994, pages 431–461, in particular pages 431–440; G. Marchionni et al. "Perfluoropolyethers: Synthesis and Commercial Products" in "Fluoropolymers '92 6th–8th Jan. 1992 at UMIST—Manchester" Paper 14.

The need was felt to have available a process to prepare perfluoropolyethers having the following combination of properties:
the perfluoropolyether products would have, in the range of wave lengths lower than 250 nm, in particular at 157 nm, a lower absorbance in comparison with the perfluoropolyethers of the prior art;
the peroxidic perfluoropolyether polymers were solubilized even at high molecular weights from the reaction solvents, forming a homogeneous solution and thus avoiding the compound separation;
the regulating agent of the molecular weight would allow the control of the reaction mass viscosity so to favour the thermal exchange, avoiding the polymer separation from the solvent during the synthesis;
in the synthesis step of the peroxidic perfluoropolyether the regulating agent of the molecular weight would give improved selectivities of the order of 90%, avoiding undesired secondary local reactions with consequent interruptions of the process owing to the fouling of the reactor and of the optical system (UV lamp) in the case of polymeriza-tion in the presence of UV radiatios;
in the synthesis step of the peroxidic perfluoropolyether would allow avoiding an uncontrolled P.O. increase to values higher than 4–5 (g of active oxygen/100 g of polymer) with risks of explosions in the system;
in the synthesis step of the peroxidic perfluoropolyether the reaction induction times were reduced or substantially eliminated avoiding the use of activators;
improved polymer yields in the thermal treatment phase.

The Applicant has surprisingly and unexpectedly found perfluoropolyethers and a synthesis process allowing to obtain perfluoropolyethers solving the above technical problem.

An object of the present invention are perfluoropolyethers having the following formula:

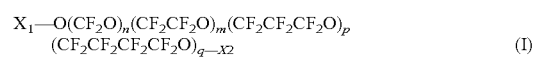

$$X_1-O(CF_2O)_n(CF_2CF_2O)_m(CF_2CF_2CF_2O)_p \\ (CF_2CF_2CF_2CF_2O)_q-X_2 \quad (I)$$

wherein:
the repeating units —$CF_2O$—, —$CF_2CF_2O$—, —$CF_2CF_2CF_2O$—, —$CF_2CF_2CF_2CF_2O$— are statistically distributed along the chain;
—$X_1$ and —$X_2$ are perfluoroalkyl chain end groups equal to or different from each other, having formula —$(CF_2)_zCF_3$ wherein z is an integer from 0 to 3;

n, m, p, q are integers comprised between 0 and 100, with the proviso that:

at least one among n, m, p and q is different from zero;

the ratio between the oxygen atoms and the carbon atoms O/C is higher than 0.33;

wherein the chlorine atoms, determined by $^{19}$F-NMR are absent.

With substantially absent chlorine atoms it is meant that their amount is lower than the sensitivity limit of the analytical $^{19}$F-NMR method, i.e. lower than 1 meq/Kg of liquid of formula (I).

The products of formula (I) have number average molecular weight from 220 to 60,000, preferably from 285 to 40,000 and are liquid compounds at the temperature of 20° C.

A further object of the present invention is a process to obtain perfluoropolyethers of formula (I) comprising the following steps:

a) synthesis of the peroxidic perfluoropolyether, carried out by one of the following reactions:
a1) TFE photooxidation, in the presence of UV light, at low temperature, generally from −40° C. to −100° C., in liquid solvents under the reaction conditions selected between perfluorocarbons and (mono) hydrofluorocarbons, represented by the following general formula:

$$C_yF_{(2y+2-x)}H_x \quad \text{(II)}$$

wherein y is an integer from 2 to 4; x is an integer equal to 0 or 1;

in the presence of fluorine as regulating agent of the molecular weight, diluted with an inert gas;

or a2) TFE oxidation using as radical initiator fluorine or hypofluorites of formula

$$R_fOF \quad \text{(III)}$$

$R_f$ being a pefluoroalkyl radical from 1 to 3 carbon atoms, by operating in the temperature range from −40° C. to −10° C. at a pressure between 0 and 12 bar, in an inert solvent under the reaction conditions, also containing chlorine;

b) thermal treatment of the peroxidic product obtained in step a) at a temperature from 150° C. to 250° C., optionally in the presence of a regulating agent of the molecular weight selected between fluorine or hypofluorite of formula (III);

c) treatment with fluorine of the polymer obtained in step b) at temperatures from 100° C. to 250° C., or by treatment with fluorine in the presence of UV radiations, by operating at tempertures from −50° C. to 120° C.

In step a1) the fluorine is generally added in such amount that the molar ratio fluorine/tetrafluoroethylene is in the range $2 \cdot 10^{-2}$–$1.2 \cdot 10^{-3}$, preferably $1.2 \cdot 10^{-2}$–$1.7 \cdot 10^{-3}$ and is diluted with the inert gas in ratios by volume from 1/50 to 1/1,000.

In step a1) the used solvents are preferably the following: perfluoropropane ($C_3F_8$), hydropentafluoroethane ($C_2F_5H$) and 2-hydroheptafluoropropane ($CF_3CFHCF_3$), $C_4F_9H$ (for example $CF_3CFHCF_2CF_3$, $(CF_3)CH$, $HCF_2CF_2CF_2F_3$)

The solvent used in step a1) is liquid at the synthesis temperatures (−40°÷−80° C.) and solubilizes the peroxidic polymer even at high molecular weights forming an homogeneous solution. This represents a remarkable advantage of the invention process since there is no separation of the peroxidic polymer. This makes possible the industrial use of the invention process since cloggings of the industrial plant piping due to uncontrolled viscosity increases do not occur; the thermal exchanges are extremely effective and this avoids uncontrolled degradation of the peroxidic polymer.

Besides it has been found that the solvents used in step a1) allow a high reaction kinetics, such to maintain high productivities combined with a low peroxide content in the polymer, lower than 4–5 (g of active oxygen/100 g of polymer), to avoid the explosion risk.

It has been unexpectedly found that the use of diluted fluorine as regulating agent of the molecular weight in step a1) allows to control the reaction mass viscosity so to favour the thermal exchange, avoiding the polymer separation from the solvent during the synthesis. See the comparative Examples.

As said, the fluorine used in step a1) must be diluted with a gas. Generally an inert gas, for example nitrogen or helium, is used as diluting gas. To dilute the fluorine also the oxygen can be used, being, in the invention reaction, is also a reactant. Indeed it has been found by the Applicant that, if undiluted fluorine is used, the fluorine produces uncontrolled local reactions and gaseous decomposition products leading to process interruptions owing to fouling of the reactor and of the optical system (UV lamp) in the case of polymerization in the presence of UV radiations. Furthermore in said cases there can be an uncontrolled P.O. increase, higher than 4–5 (g of active oxygen/100 g of polymer), leading to explosion risks in the system. When the fluorine in step a1) is used diluted it acts as molecular weight regulator with a very high selectivity, of the order of 90%.

The Applicant has furthermore found that the fluorine in step a1) reduces and substantially removes the reaction induction times avoiding the use of reaction activators.

In step a2), wherein the TFE oxidation is carried out without the use of the UV light, the used solvents can be those above mentioned, or chlorinated solvents. For example $CF_2Cl_2$, optionally in admixture with $COF_2$, can be mentioned.

In step a2) the molar ratio tetrafluoroethylene/chemical initiator ranges from 10 to 200, preferably from 40 to 120.

In step b) the use of fluorine or hypofluorites of formula (III) can be omitted if the control of the molecular weight is not necessary, for example when the kinematic viscosity of the peroxidic raw product is lower than 5,000 cSt.

In step b) generally the fluorine or hypofluorites of formula (III), when present, are used with a flow-rate from $1 \cdot 10^{-2}$ to 3, moles·h/Kg polymer, preferably from $2 \cdot 10^{-2}$ to 2.

With the process of the present invention, as said, linear perfluoropolyethers are obtained having an absorption in optical applications at 157 nm extremely lower than that of the perfluoropolyethers of the prior art.

Furthermore the Applicant has found that the use of fluorine or hypofluorites of formula (III) in thermal treatment step b) allows to obtain a significant increase of the polymer yields. See the Examples.

Step a) and step b) of the process of the present invention can be carried out in a discontinuous, semicontinuous or continuous way.

Step b) ends when in the polymer the peroxide is substantially absent. With substantially absent it is meant that its value (P.O.) is equal to or lower than the sensitivity limit of the used analytical method (1 ppm). See the Examples. Generally the thermal treatment times are from 10 h to 30 h, in function of the P.O. and the temperture used in this step.

Step c) is usually carried out in a discontinuous way. The reaction ends when, at $^{19}$F-NMR analysis, it is observed that the functional end groups (mainly —OCF$_2$COF and —OCOF) have been transformed into perfluoroalkyl end groups (method sensitivity limit: 1 meq/Kg polymer). See the Examples.

In step c) the fluorine is fed in such amount to have a concentration in the perfluoropolyether generally corresponding to the fluorine solubility limit, which in the range of the used temperatures is of the order of $10^{-2}$ moles of fluorine/litre of polymer.

Optionally the product can be distilled to obtain fractions having a given number average molecular weight and a determined molecular weight distribution.

The perfluoropolyethers of the present invention, when used for optical applications, for example as index matching medium in the immersion lithography wherein a wave length of 157 nm is used, are preferably used substantially free from dissolved gases, in particular oxygen. With the substantially free from oxygen wording, it is meant that the residual oxygen concentration in the liquid is not higher than $2 \cdot 10^{-5}$ meq/Kg of polymer. The treatment is generally carried out under vacuum, for example $10^{-3}$ mbar, generally by using a mechanical pump. The degassing is preferably carried out by initially maintaining the sample at room temperature and then cooling it in liquid nitrogen. When the perfluoropolyether shows a low boiling point, preferably the process is carried out by cooling the compound with liquid nitrogen and subsequently carrying out the degassing.

The following Examples are given for illustrative and not limitative purposes of the present invention.

EXAMPLES

Absorbance Measurement Method

The absorbance measurements have been carried out on a VUV (vacuum UV) spectrometer operating under vacuum equipped with a hydrogen vapour lamp and a 1200 lines/mm chromo-iridium grid capable to carry out transmission and reflection measurements between 100 and 250 nm with a 0.5 nm resolution.

The samples have been put in an aluminum seal cell equipped with two CaF$_2$ windows separated by a PTFE spacer having a thickness ranging from 25 micron to 2 mm. The measurement has been carried out with a double ray technique capable to compensate possible variations of the lamp intensity. The absorbance values have been calculated by subtracting from the experimental measurement the absorption of the windows obtained with the empty cell. The transmittance measurement accuracy is of the order of 5%. The reported absorbances have been calculated by the relation $$A(\text{cm}^{-1}) = \log_{10}(T)/s,$$

wherein T is the transmittance and s is the thickness (in cm) of the spacer interposed between the windows.

The samples have been carefully degassed to remove the dissolved gases, by treatment under vacuum with a mechanical pump ($10^{-3}$ mbar) by initially maintaining the sample at room temperature and then cooling it with liquid nitrogen.

The degassed product has been kept in glass phial equipped with gastight "Rotaflo" tap.

The measurement cell has been filled and sealed in dry-box fluxed with nitrogen to avoid air absorption from the sample.

Determination of the Amount of Chlorinated End Groups as meq/Kg.

The amount is calculated by the following formula:

$$\frac{1000 \times 2 \times (\% - CF_2Cl + \% - CF_2CF_2Cl) \times 10}{Mn}$$

wherein:
(% —CF$_2$Cl+% —CF$_2$CF$_2$Cl)=sum of the molar percentages of the chlorinated end groups, determined by 19F-NMR.
Mn=number average molecular weight, determined, for example, by $^{19}$F-NMR.
The method sensitivity limit is 1 meq/Kg.

Determination Method of the Peroxide Amount (P.O.)

The analysis of the peroxide content is carried out by iodometric titration, according to the following method. A weighed polymer amount (some grams) is dissolved in about 20 ml of Galden® ZT 130 (hydrofluoropolyether having —CF$_2$H end groups) produced by the Applicant. 1 ml of glacial acetic acid and 30 ml of a sodium iodide solution 5% w/w in isopropyl alcohol are added. The resulting suspension is left under stirring for 15 minutes, until complete iodide dissolution. The iodine developed from the reaction with the peroxide is titered with an aqueous solution of sodium thiosulphate having a known titre by using a potentiometric titration instrument Mettler® DL 40, equipped with platinum electrode and reference electrode.

The peroxide (P.O.) content is expressed in g of active oxygen (m.w. 16)/100 g of polymer.

The method sensitivity limit is 1 ppm.

Determination Method of the Kinematic Viscosity

The determination is carried out with Cannon-Fenske type viscometers previously conditioned at 20° C.

Determination Method of the Molecular Weight

The molecular weight is determined by $^{19}$F-NMR, by using an instrument operating at 400 MHZ frequency.

The spectrum shows the signals due to the fluorine atoms linked to the main chain end groups (CF$_3$O—, CF$_3$CF$_2$O—, ClCF$_2$O—, ClCF$_2$CF$_2$O—, FC(O)CF$_2$O—, FC(O)O—) and to the repeating units present in the polymeric chain.

From the ratio between the signals of the fluorine atoms linked to the end groups and respectively to the repeating units present in the polymeric chain it is calculated the number average molecular weight.

Determination Method of the Ratio Oxygen Atoms/Carbon Atoms (O/C)

By the previous $^{19}$F-NMR analysis of the polymer, the respective molar percentages of the various repeating units are determined. From the number of carbon and oxygen atoms contained in each repeating unit present, it is calculated the O/C molar ratio.

Example 1

Synthesis of a Linear Perfluoropolyether Free from Chlorine having Number Average Molecular Weight 10,000 and an O/C Ratio=0.7 a) Synthesis of the Peroxidic Perfluoropolyether

A cylindrical photochemical reactor is used, equipped inside with coaxial sheath wherein a high pressure mercury lamp (Hanau TQ 150) is inserted, cooled by circulating fluid (Galden® D100) transparent at the UV radiations emitted by the lamp, furthermore equipped with a condenser maintained at −75° C. and with feeding lines of the reacting gases, which is cooled at −50° C. by an external bath. 847.2 g of 2-hydroheptafluoropropane (R 227 ea) are introduced. Then one starts to feed 18.0 Nl/h of oxygen and immediately afterwards the UV lamp is switched on. Then 9.0 Nl/h of tetrafluoroethylene are fed through a separated bubbling inlet and 2.5 Nl/h of a 1% molar fluorine mixture in nitrogen, fed together with the oxygen; the reactant flow-rates are maintained constant for the whole duration of the test (300 minutes), maintaining the reactor temperature at −50° C.

During the whole time of the reaction the solution remains homogeneous.

At the end of the reaction the reactant feedings are interrupted, the UV lamp is switched off and the solvent and the gaseous by-products are let evaporate. The weight of the recovered product, after degassing, is 91.3 g P.O.=2.28; the $^{19}$F-NMR analysis confirms the following structure:

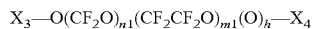

wherein the —$X_3$ and —$X_4$ end groups are equal to or different from each other. The end groups and the respective molar percentages with respect to the total of the end groups are the following: —$CF_3$, 41.2%; —$CF_2CF_3$, 42.4%; —$CF_2COF$, 16.3%. The number average molecular weight is 18,000; $h/(n1+m1)=0.108$, $m1/n1=0.90$; $O/C=0.76$.

b) Thermal Treatment 57.0 grams of the product obtained in the previous step are introduced in a glass reactor equipped with magnetic stirrer, with sheath for temperature measurement by thermocouple, with nitrogen inlet and outlet of gaseous products. 5 Nl/h of nitrogen are fed for the whole duration of the test. The system temperature is gradually increased under stirring by an oil bath until reaching 150° C. One starts to feed gaseous fluorine at a flow-rate of 0.2 Nl/h maintaining 150° C. for 1 h. Successively the temperature is increased of 10° C. every hour until reaching 190° C. The reaction mixture is maintained for two hours at this temperature. Then the reaction temperature is increased of 10° C. every two hours until reaching 230° C. After two hours at said temperature, the reaction mixture is treated at 235° C. for 4 h.

It is cooled and 47 g of product are recovered resulting free from peroxide by the above analysis method; the $^{19}$F-NMR analysis confirms the following structure:

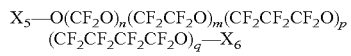

wherein the —$X_5$ and —$X_6$ end groups are equal to or different from each other. The end groups and the respective molar percentages with respect to the total of the end groups are the following: —$CF_3$, 52.4%; —$CF_2CF_3$, 42.0%; —$CF_2COF$, 5.6%. The number average molecular weight is 10,000; $m/n=0.65$; $(p+q)/-(m+n+p+q)=0.023$; $n/(n+m+p+q)=0.613$; $O/C=0.70$.

c) Neutralization of the Acid End Groups

The product obtained in the previous step is treated with gaseous fluorine (5 Nl/h) at 230° C. for 10 h. 44.5 g of product are obtained, having the following structure:

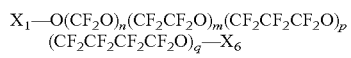

wherein the —$X_1$ and —$X_2$ end groups are equal to or different from each other. The end groups and the respective molar percentages with respect to the total of the end groups are the following: —$CF_3$, 58.0%; —$CF_2CF_3$, 42.0%. The number average molecular weight is 10,000; $m/n=0.65$; $(p+q)/(m+n+p+q)=0.023$; $n/(n+m+p+q)=0.613$; $O/C=0.70$.

The $^{19}$F-NMR analysis confirms the absence of chlorinated end groups in the product.

Example 2 (Comparative)

Synthesis of a Peroxidic Perfluoropolyether by Carrying Out the Photosynthesis Step a) in the Absence of Gaseous Fluorine.

Step a) of the Example 1 is repeated in the absence of fluorine. After one hour it is necessary to interrupt the synthesis since the perfluoropolyether separates from the solvent. The recovered product has P.O.=5.5 by the above described analytical method.

Example 3 (Comparative)

Synthesis of a Peroxidic Perfluoropolyether by Carrying out the Photosynthesis Step a) in a Solvent Containing Chlorine By using the same equipment described in step a) of the Example 1, the mixture is cooled to −60° C. by means of an external bath and 636 g of dichlorodifluoromethane (R 12) are introduced. Then one starts to feed 18.0 Nl/h of oxygen and immediately afterwards the UV lamp is switched on. Then 9.0 Nl/h of tetrafluoroethylene are fed through a separated bubbling inlet, and 4.2 Nl/h of a 2% molar fluorine mixture in nitrogen, fed together with the oxygen; the reactant flow-rates are maintained constant for the whole duration of the test (240 minutes), by maintaining the reactor temperature at −60° C.

At the end of the reaction the procedure described in the Example 1 is followed. The weight of the recovered product, after degassing, is 110.2 g. P.O.=3; kinematic viscosity=400 cSt. The $^{19}$F-NMR analysis confirms the following structure:

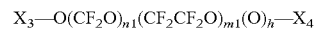

wherein the —$X_3$ and —$X_4$ end groups are equal to or different from each other. The end groups and the respective molar percentages with respect to the total of the end groups are the following: —$CF_3$, 21.7%; —$CF_2CF_3$, 53.0%; —$CF_2COF$, 5.9%; —$OCF_2Cl$, 8.5%; —$OCF_2CF_2Cl$, 10.9%. The number average molecular weight is 8,400; $h/(n1+m1)=0.260$, $m1/n1=1.590$; $O/C=0.73$.

100 g of the so obtained peroxidic product are subjected to steps b) and c) as described in the Example 1, except that in this case fluorine is not used in step b). 61.7 g of perfluoropolyether are obtained, having formula:

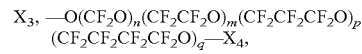

wherein the —$X_3$, and —$X_4$, end groups are equal to or different from each other. The end groups and the respective molar percentages with respect to the total of the end groups are the following: —$CF_3$, 27.9%; —$CF_2CF_3$, 52.9%; $CF_2Cl$, 9.1%; $CF_2CF_2Cl$, 10.1%. The number average molecular weight is 12,500; $m/n=0.76$; $(p+q)/(m+n+p+q)=0.025$; $n/(n+m+p+q)=0.553$; $O/C=0.67$.

The Example shows that by synthesizing the peroxidic perfluoropolyether using in the photosynthesis (step a)) a solvent containing chlorine in the presence of fluorine as regulating agent of the molecular weight, compounds having chlorinated end groups are obtained.

Example 4

Synthesis of a Linear Perfluoropolyether Free from Chlorinated End Groups wherein the Thermal Treatment Step b) is Carried out in Absence of a Molecular Weight Regulator (Gaseous Fluorine)

a) Synthesis of the Peroxidic Perfluoropolyether

The process described in the Example 1 is repeated.

b) Thermal Treatment 58.7 grams of the product obtained in the previous step are introduced in the reactor described in step b) of the Example 1 and the procedure described therein is followed, except that gaseous fluorine is not fed.

At the end the mixture is cooled and 41.2 g of product are recovered, which is free from peroxide; the $^{19}$F-NMR analysis confirms the following structure:

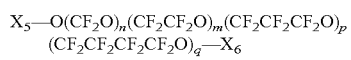

wherein the —$X_5$ and —$X_6$ end groups are qual to or different from each other. The end groups and the respective molar percentages with respect to the total of the end groups are the following: —$CF_3$, 37.6%; —$CF_2CF_3$, 42.7%; —$CF_2COF$, 19.7%. The number average molecular weight is 19,000; m/n=0.59; (p+q)-/(m+n+p+q)=0.023; n/(n+m+p+q)=0.613; O/C=0.70.

c) Neutralization of the Acid End Groups

The product obtained in step b) is treated with fluorine (5 Nl/h) at 230° C. for 10 h. 39.7 g of product having the following structure:

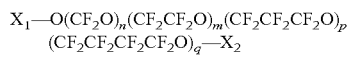

are obtained, wherein the —$X_1$ and —$X_2$ end groups are equal to or different from each other. The end groups and the respective molar percentages with respect to the total of the end groups are the following: —$CF_3$, 59.0%; —$CF_2CF_3$, 41.0%. The number average molecular weight is 19,400; m/n=0.60; (p+q)-/(m+n+p+q)=0.023; n/(n+m+p+q)=0.613; O/C is 0.70.

The $^{19}$F-NMR analysis confirms the absence of chlorinated end groups in the product.

By comparing the conditions in which the step b) in the Example 4 is carried out with those of the Example 1, it is noticed that, by operating in the presence of fluorine (Example 1), the yield of step b) increases of about 10% and it is possible to modulate the molecular weight.

The analytical characteristics of the product, in particular the absorbance at 157 nm, are reported in Table 1.

Example 5

Synthesis of a Linear Perfluoropolyether Free from Chlorinated end Groups having Number Average Molecular Weight 4,000 and O/C=0.54 a) Synthesis of the Peroxidic Perfluoropolyether 20 litres of a mixture of dichlorodifluoromethane and $COF_2$ in molar ratio 1:1 are introduced in a 25 l AISI steel reactor at the temperature of −80° C. 400 Nl/h of gaseous oxygen are fed bringing the reactor inside to the pressure of 10 absolute bar. Then 2 Nl/h of fluorine, 224 Nl/h of TFE are fed, maintaining pressure and temperature at the above values for 180 minutes.

At the end of the reaction the solvent is let evaporate and 2.4 kg of product having P.O.=2.7 are recovered. The $^{19}$F-NMR analysis confirms the following structure:

wherein the —$X_3$ and —$X_4$ end groups are equal to or different from each other. The end groups and the respective molar percentages with respect to the total of the end groups are the following: —$CF_3$, 2.0%; —$CF_2CF_3$, 98.0%. The number average molecular weight is 16,200; h/(n1+m1)=0.198; m1/n1=6.8; O/C=0.64.

b). Thermal Treatment

A 500 ml glass flask is used, equipped with stirrer, sheath for the temperature control, dropping funnel, two way pipe-fitting for the addition of the transfer agent methyl hypofluorite ($CF_3OF$) and outlet of the reaction gases (mainly $COF_2$), glass bubbling inlet for the continuous outlet of the obtained product, having an height such that the reaction mass level in the reactor remains constant. 195 g of the peroxidic perfluoropolyether obtained in the previous step are fed and the mixture is slowly heated with oil bath under stirring until reaching the temperature of 230° C. Successively one starts to continuously feed in the reactor the peroxidic perfluoropolyether with a flow-rate equal to 172 g/h and contemporaneously the methyl hypofluorite transfer agent with a flow-rate of 1.2 Nl/h. These flow-rates are maintained constant for 10 h, continuously collecting the reaction product.

At the end of this period of time, the reaction is interrupted. The collected product, corresponding to an amount of 1,375 g, is heated to 240° C. in a reactor under stirring until removal of the residual P.O. amounts.

The obtained product has the following structural formula:

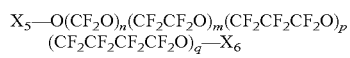

wherein the $X_5$, $X_6$ end groups are equal to or different from each other. The end groups and the respective molar percentages with respect to the total of the end groups are the following: $CF_3$—, 8.0%; $CF_3CF_2$—, 85.5%; $CF_3CF_2CF_2$—, 3.0%; $CF_3$ $CF_2CF_2C$—$F_2$, 3.0%; —$CF_2COF$, 0.5%. The number average molecular weight is 4,000 and the molar ratios of the chain units are respectively m/n=2.34, (p+q)/(m+n+p+q)=0.078 and n/(n+m+p+q)=0.276; O/C=0.54.

c) Neutralization of the Acid End Groups by Photochemical Route

The product obtained in step b) is introduced in a photochemical reactor equipped with a 150 W high pressure mercury lamp and a photochemical fluorination is carried out at the, temperature of 50° C. with a gaseous fluorine flow equal to 5 litres/h for 11 hours in total.

By the $^{19}$F-NMR analysis the product results to have the following structure:

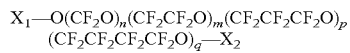

wherein $X_1$, $X_2$ are equal to or different from each other. The end groups and the respective molar pecentages with respect to the total of the end groups are the following: —$CF_3$, 10.0%; $CF_3CF_2$—, 85.0%; $CF_3CF_2CF_2$—, 2.5%; $CF_3CF_2CF_2CF_2$—, 2.5%. The num average molecular weight is 4,000. The molar ratios of the chain units are the following: m/n=2.34, n/(m+n+p+q)=0.276, (p+q)/(m+n+p+q)=0.078, O/C=0.54.

The Examples 1 and 5 show that by using the process described in the present invention it is possible to modulate the molecular weight of the linear perfluoropolyethers free from chlorinated end groups.

The analytical characteristics of the product, in particular the absorbance at 157 nm, are reported in Table 1.

Examples 6–8 (Comparative)

Three different commercial samples of Fomblin® Z have been analyzed as from Table 1.

In the Example 6 (comparative) a commercial sample of Fomblin® Z 25 has been used, in the Example 7 (comparative) a sample of Fomblin® M 60, in the Example 8 (comparative) a sample of Fomblin® M 30.

From the Table it is observed that the absorbance at 157 nm of said samples is higher of about one order of magnitude than that of the compounds of the present invention.

TABLE 1

Determination of the absorbance at 157 nm of the samples obtained in the Examples from 4 to 8 comp. In the Table also the following parameters are reported: number average molecular weight (Mn), kinematic viscosity ($\eta$), the amount of the chlorinated end groups expressed in meq/Kg.

| Sample | Mn | Chlorinated end groups (meq/Kg) | $\eta$ (cSt) | Absorbance ($cm^{-1}$) |
|---|---|---|---|---|
| Ex. 4 | 19,400 | 0 | 650 | 0.5 |
| Ex. 5 | 4,000 | 0 | 30 | 0.6 |
| Ex. 6 (comparative) | 15,200 | 26.6 | 260 | 5.0 |
| Ex. 7 (comparative) | 19,700 | 38.3 | 600 | 7.5 |
| Ex. 8 (comparative) | 15,100 | 71.8 | 280 | 12.5 |

The invention claimed is:

1. A process to obtain perfluoropolyethers having a reduced absorption at wave lengths lower than 250 nm and having the formula:

$$X_1-O(CF_2O)_n(CF_2CF_2O)_m(CF_2CF_2CF_2O)_p(CF_2CF_2CF_2CF_2O)_q-X_2 \quad (I)$$

wherein:
the repeating units $-CF_2O-$, $-CF_2CF_2O-$, $-CF_2CF_2CF_2O-$, $-CF_2CF_2CF_2CF_2O-$ are statistically distributed along the chain;
$-X_1$ and $-X_2$ are perfluoroalkyl chain end groups equal to or different from each other, having formula $-(CF_2)_zCF_3$ wherein z is an integer from 0 to 3;
n, m, p, q are integers comprised between 0 and 100, with the proviso that:
at least one among n, m, p and q is different from zero;
the ratio between the oxygen atoms and the carbon atoms O/C is higher than 0.33;
wherein the chlorine atoms, determined by $^{19}F$-NMR, are absent,
wherein said process comprises the following steps:
a) synthesis of the peroxidic perfluoropolyether, carried out by one of the following reactions:
a1) TFE photooxidation in the presence of UV light, at low temperature, generally from −40° C. to 100° C., in liquid solvents under the reaction conditions selected between perfluorocarbons and (mono)hydrofluorocarbons, represented by the following general formula:

$$C_yF_{(2y+2-x)}H_x \quad (II)$$

wherein y is an integer from 2 to 4; x is an integer equal to 0 or 1;
in the presence of fluorine, as regulating agent of the molecular weight, diluted with an inert gas;

or
a2) TFE oxidation using as radical initiator fluorine or hypofluorites of formula $$R_fOF \quad (III)$$

$R_f$ being a pefluoroalkyl radical from 1 to 3 carbon atoms, by operating in the temperature range from −400° C. to −100° C. at a pressure between 0 and 12 bar, in an inert solvent under the reaction conditions, also containing chlorine;
b) thermal treatment of the peroxidic product obtained in step a) at a temperature from 150° C. to 250° C., optionally in the presence of a molecular weight regulator selected between fluorine or hypofluorite of formula (III);
c) treatment with fluorine of the polymer obtained in step b) at temperatures from 100° C. to 250° C., or by treatment with fluorine in the presence of UV radiations, operating at temperatures from −50° C. to 120° C.

2. A process according to claim 1, wherein in step a1) the fluorine is added in molar ratio fluorine/tetrafluoroethylene in the range $2 \cdot 10^{-2}-1.2 \cdot 10^{-3}$, and is diluted with the inert gas in ratios by volume from 1/50 to 1/1,000.

3. A process according to claim 1, wherein in step a1) the used solvents are the following: perfluoropropane ($C_3F_8$), hydropentafluoroethane ($C_2F_5H$) and 2-hydroheptafluoropropane ($CF_3CFHCF_3$),$C_4F_9H$.

4. A process according to claim 1, wherein the fluorine used in step a1) is diluted with an inert gas selected between nitrogen or helium or it is diluted with oxygen.

5. A process according to claim 1, wherein in step a2), chlorinated solvents are used.

6. A process according to claim 5, wherein $CF_2Cl_2$ is used in admixture with $COF_2$.

7. A process according to claim 1, wherein in step a2) the molar ratio tetrafluoroethylene/chemical initiator ranges from 10 to 200.

8. A process according to claim 1, wherein in step b) the use of fluorine or of hypofluorites of formula (III) is omitted when the kinematic viscosity of the peroxidic raw product is lower than 5,000 cSt.

9. A process according to claim 1, wherein in step b) the fluorine or the hypofluorites of formula (III), when present, are used with a flow-rate, expressed in moles·h/Kg polymer from $1 \cdot 10^{-2}$ to 3.

10. A process according to claim 1, wherein steps a) and b) are carried out in a discontinuous, semicontinuous or continuous way.

11. A process according to claim 1, wherein the step c) is carried out in a discontinuous way.

12. A process according to claim 1, wherein said perfluoropolyethers having a reduced absorption at wave lengths at 157 nm.

13. A process according to claim 1, wherein in step a1) the fluorine is added in molar ratio fluorine/tetrafluoroethylene in the range $1.2-10^{-2}-1.7 \cdot 10^{-3}$ and is diluted with the inert gas in ratios by volume from 1/50 to 1/1,000.

14. A process according to claim 1, wherein in step a2), $CF_2Cl_2$ is used.

15. A process according to claim 1, wherein in step a2) the molar ratio tetrafluoroethylene/chemical initiator ranges from 40 to 120.

16. A process according to claim 1, wherein in step b) the fluorine or the hypofluorites of formula (III), when present, are used with a flow-rate, expressed in moles·h/Kg polymer from $2 \cdot 10^{-2}$ to 2.

* * * * *